United States Patent [19]

Stark et al.

[11] Patent Number: 5,350,515
[45] Date of Patent: Sep. 27, 1994

[54] INTERNALLY POTTED END CAP FOR A PLEATED FILTER MEDIUM

[75] Inventors: Stephen Stark, Wilmington; Raymond Wnenchak, Newark, both of Del.

[73] Assignee: W. L. Gore & Associates, Inc., Newark, Del.

[21] Appl. No.: 38,771

[22] Filed: Mar. 29, 1993

[51] Int. Cl.⁵ .................................. B01D 27/06
[52] U.S. Cl. .......................... 210/493.2; 210/493.5; 210/497.2; 55/498; 55/500; 55/502; 55/521; 55/DIG. 5; 156/218; 264/DIG. 48
[58] Field of Search ............... 210/488, 489, 490, 491, 210/493.1, 493.2, 493.5, 497.01, 497.2; 55/497, 498, 521, DIG. 5, 500, 502; 156/218; 264/DIG. 48

[56] References Cited

U.S. PATENT DOCUMENTS

| 4,663,041 | 5/1987 | Miyagi et al. | 210/493.2 |
| 4,929,354 | 5/1990 | Meyering et al. | 210/493.2 |

FOREIGN PATENT DOCUMENTS

| 160168 | 11/1985 | European Pat. Off. |
| 213930 | 3/1987 | European Pat. Off. |
| 520737 | 12/1992 | European Pat. Off. |
| 048891 | 4/1971 | Fed. Rep. of Germany |
| 840570 | 7/1960 | United Kingdom ............. 210/493.2 |
| WO8505286 | 12/1985 | World Int. Prop. O. |

Primary Examiner—Robert A. Dawson
Assistant Examiner—W. L. Walker
Attorney, Agent, or Firm—Gary A. Samuels

[57] ABSTRACT

The invention comprises a filter cartridge including a cylindrical filter medium potted into a top cap, and having an internally potted bottom closure molded in place inside the filter medium.

7 Claims, 2 Drawing Sheets

INTERNALLY POTTED END CAP FOR A PLEATED FILTER MEDIUM

FIELD OF THE INVENTION

The invention relates to the field of filter cartridges, more particularly to filter cartridges wherein a filter medium is potted into end caps.

BACKGROUND OF THE INVENTION

A great variety of filter cartridges embodying pleated filter media potted into end caps is known in the art. Most of those cartridges have a form of support for the media in the form of wire framing, perforated sheeting of various forms, and other means, both internally and externally placed around the filter media and potted into the end caps along with that media.

One of the enduring problems to be solved with these forms of filter cartridges is the tendency of the particles being filtered to hang up in corners and on ledges and other protuberances around the support means and the areas where they touch the filter media.

One attempt to solve this problem was made in the cartridge of Manniso, et al., as described in U.S. Pat. No. 4,878,930, wherein a pleated lower end cap was fitted around the pleated filter medium to match the shape of the pleated filter medium to leave a minimum of protuberance on the cartridge on which the material being filtered could lodge, thus partially blocking or reducing the filtration rate of the surface of the filter medium. Other references cited in that patent outline the art known at that time.

However, even that cartridge does not completely eliminate particle lodgement, only minimizes it. It would be useful to have a cartridge in which there is no lodgement of particles on the surface of the filter medium. This could be quite important in the areas of pharmaceutical and biologicals manufacturer to prevent bacterial growth at the sites of lodged particles, in food processing or manufacture, or in chemical manufacture processes where dust residence time on a cartridge should be short to avoid degradation of the chemical material being filtered.

SUMMARY OF THE INVENTION

The invention comprises a filter cartridge including a cylindrical filter medium potted into a top cap, and having an internally potted bottom closure molded in place inside the filter medium. The bottom of the cartridge is preferably of a star shape. Any curable liquid potting resin can be used. Epoxy material is preferred of a viscosity about 5,000 to about 100,000 centipoise before heat and curing. Preferred filter media comprise a filter membrane, preferably in pleated form. The filter membrane may also have a textile backing bonded to the it. Expanded polytetrafluoroethylene is a preferred membrane, although others may be used.

An integral part of the invention is the method of manufacture which comprises the steps of obtaining a filter of a cylindrically shaped filter medium, potting by standard method and materials into a top cap, setting the opposite end of the medium from the top cap on a heated resilient surface, pouring into the inside of the cylindrically-shaped filter medium a sufficient quantity of liquid potting material to form a closed bottom, curing the potting material to a solid, and removing from the heated resilient surface. A protuberance-free internal bottom closure member is formed thereby. Use of a liquid-proof membrane prevents penetration of the potting liquid to the outer surface of the cartridge.

DETAILED DESCRIPTION OF THE INVENTION

With reference to the figures, a more detailed delineation of the filter cartridge of the invention is now made, including full descriptions of the process of manufacture, materials of construction, and function of the cartridge.

Figure 1:
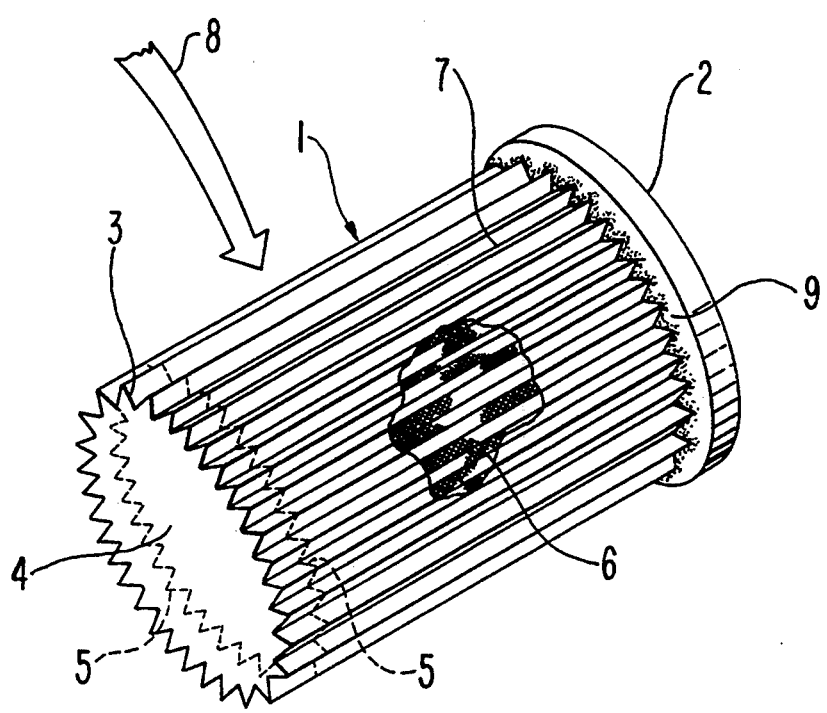
FIG. 1 is a broken perspective view of a pleated filter cartridge of the invention showing its characteristic flat star-shaped bottom and the layers of bonded filter medium materials.
Figure 2:
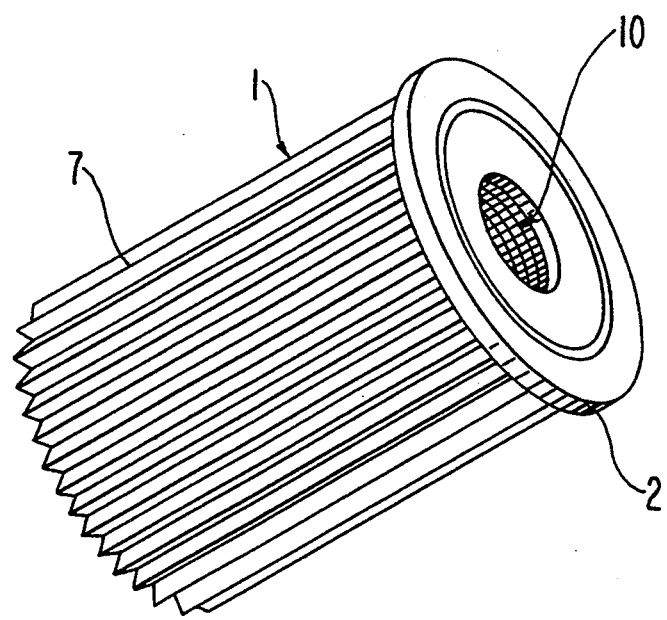
FIG. 2 is a perspective view of the filter cartridge showing the top cap and the edge of the star-shaped bottom.

FIG. 1 shows in a broken perspective view a filter cartridge of the invention with arrow 8 indicating the direction of flow of a material to be filtered by the cartridge, outside to inside. The filter medium 1 has been prepared by folding into pleated form and then forming a cylinder, with any membrane layer on the outside facing the flow of material to be filtered. The cylinder can be placed around an optional cylindrical support screen 10 (shown in FIG. 2). The edges are bonded together to hold the cylinder in place around screen 10. The cylinder of filter medium 1 and screen 10 is set upright in a top cap 2 of metal or plastic and potted and sealed into place in top cap 2 by standard potting methods using a plastisol, silicone rubber, epoxy polymer, or the like, for example. The potting material is shown as 9.

Filter medium 1 is composed of filter membrane 7 and textile material 6. The medium is pleated and the pleats set before forming it into a cylindrical form. Preferred filter membrane materials include polyester, polytetrafluoroethylene (PTFE), polyamide, polypropylene, microporous expanded PTFE or other microporous membrane, for example.

Support screen 10 may be a perforated metal or plastic tube or screen, or a slit and stretched metal sheet.

The textile material 6 can be non-woven and is bonded to membrane 7 on the outside of the non-woven filter material ! (the backing).

Once potting material 9 has hardened, the filter cartridge is set upright on a resilient heated surface, unpotted edge down. The resilient surface may be of a silicone rubber or other like material which resists heat and is sufficiently resilient to allow complete sealing of the edges of filter medium 6 on its surface by the addition of weight, for example, about 5 pounds, applied against the top cap 2 of the cartridge. A quantity of potting materials, for example, epoxy resin of about 5,000 to about 100,000 centipoise viscosity is poured into the inner space of the top-capped cylinder of filter medium sufficient to fill the bottom thereof completely to about a depth of one-half inch or more. The epoxy resin bonds to the filter medium, fills gaps, crevaces, and surface irregularities and does not leak out of the cylinder or through the membrane bonded medium to form any ledges, edges, surface discontinuities, or other protuberances of any kind on the outside surface thereof. An amine hardener in the potting material with heat from the resilient surface causes potting material, e.g., the epoxy resin, to harden into an internal flat bottom cap 4 of the filter cartridge. When the bottom cap 4 is fully cured (30 minutes or so) and the filter cartridge is removed, inspection shows that no edges, rims, or other protuberances have formed on the outside of the filter cartridge. Dotted lines 5 show the top edge of the flat bottom cap 4 inside the filter cartridge. The filter medium 6 and internal support screen 10 are now firmly imbedded and sealed into potting material 9 and bottom cap 3.

Internal support screen 10 is slightly shorter than filter medium 6 at each end so complete sealing is effected around it so it will not protrude from the bottom surface of bottom cap 4 after it is formed in place.

It is a major facet of the invention and a major advantage that no edges, rims, blobs, surface discontinuities, or any other type of protuberance be formed on the outer surface of the filter cartridge since the primary uses of the cartridge intended are in pharmaceutical processing, food processing or manufacture, and chemical processing, where it is important that no material being filtered lodge on protuberances. Bacterial growth can occur much more easily on protuberances on a filter and chemical particles may degrade if lodged too long on a filter during processing.

The outside of the cartridge may be cleaned in place by aqueous detergent solutions by in-line cleaning or other cleaning systems.

We claim:

1. A filter cartridge comprising:

(a) a cylindrically shaped, pleated filter medium closed at both ends by a potting medium;
    (b) one end of said filter medium being potted into the medium,
    (c) the other end being substantially entirely closed by potting medium located entirely inside the filter medium so that no potting medium forms on the outside of the filter medium nor protrudes on the outer surface of the medium, said potting medium situated such that the area between each pleat is entirely closed with potting medium and is continuous from pleat to pleat.

2. A filter cartridge of claim 1 wherein said polymer potting material comprises a curable epoxy material.

3. A filter cartridge of claim 2 wherein said epoxy material is amine curable.

4. A filter cartridge of claim 3 wherein said epoxy material is liquid and when poured into said filter medium for curing, has a viscosity of about 5,000 to about 100,000 centipoise.

5. A filter cartridge of claim 2 wherein said epoxy material is heat curable.

6. A cartridge of claim 1 wherein said filter medium comprises a non-woven textile fiber sheet bonded to a microporous polymer membrane, which membrane forms the outer surface of the medium facing the material to be filtered.

7. A cartridge of claim 6 wherein said microporous polymer membrane comprises expanded polytetrafluoroethylene.

* * * * *